Aug. 18, 1936.   F. O. COLE   2,051,130
IGNITION APPARATUS FOR FLUID FUEL BURNERS
Filed June 2, 1933

INVENTOR:
Frank O. Cole
by Carr Tane & Gravely
THEIR ATTORNEYS.

Patented Aug. 18, 1936

2,051,130

UNITED STATES PATENT OFFICE 2,051,130

IGNITION APPARATUS FOR FLUID FUEL BURNERS

Frank O. Cole, Detroit, Mich., assignor to The Timken Silent Automatic Company, Detroit, Mich., a corporation of Michigan Application June 2, 1933, Serial No. 673,948

11 Claims. (Cl. 175—115)

This invention relates to fluid fuel burners, especially burners of the type known as rotary wall flame burners. In burners of this type, ignition is effected by an electric spark between electrodes which are located near the outer bottom corner of the combustion chamber and effectively insulated from each other. In this location, the electrodes are exposed to intense heat and, when the insulation material gets hotter than 500° F. to 700° F. varying with the material, it is liable to lose temporarily much of its insulating value, although it recovers such value on cooling. During such temporary loss of insulating value and consequent leakage of current, the electrical system will not generate the spark necessary for ignition of the fuel but is temporarily inoperative.

The principal object of the present invention is to overcome such tendency of the ignition system to become temporarily inoperative under the influence of heat. The invention consists principally in an elongated hollow walled cover of insulating material for the electrode which is mounted in and extends outwardly through and beyond the hearth or adjacent portion of the combustion chamber. It also consists in the parts and in the combinations and arrangement of parts hereinafter described and claimed.

Figure 1:
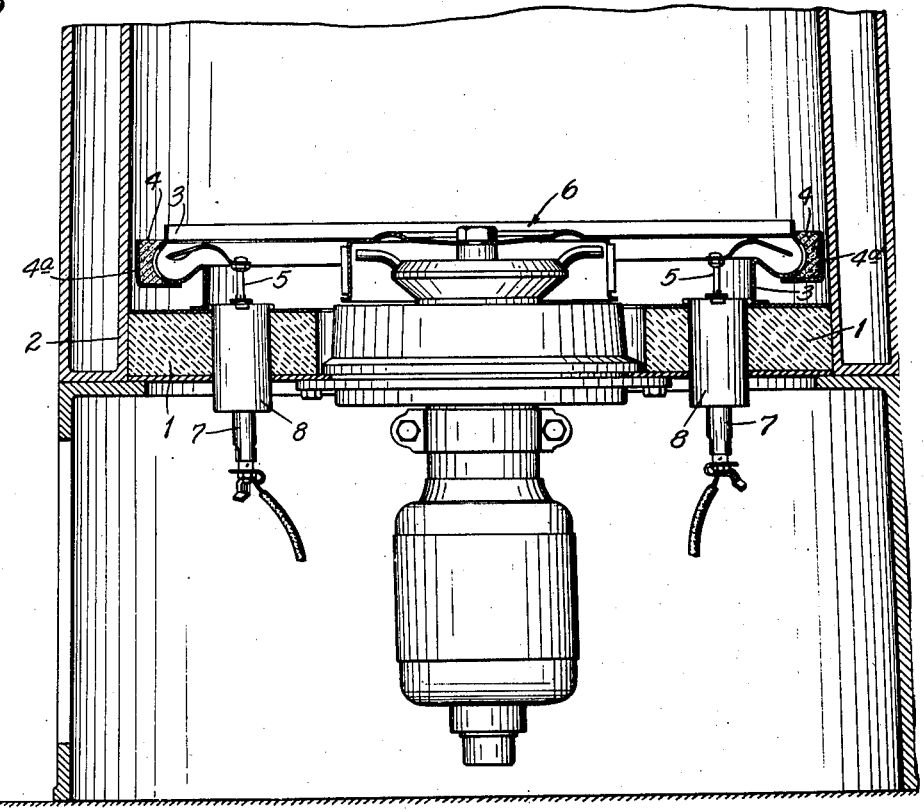
Figure 2:
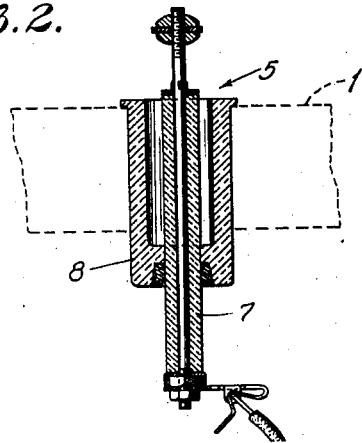

In the accompanying drawing, wherein like reference numerals refer to like parts wherever they occur, Fig. 1 is a view partly in vertical section through a burner of the rotary wall flame type showing one of its electrodes conforming to my invention; and Fig. 2 is a view of such electrode with my insulating cover thereon.

The burner illustrated in the accompanying drawing comprises a hearth 1, a surrounding wall 2, a metallic combustion or flame ring 3 in the angle between the hearth 1 and the wall 2 of the combustion chamber, electrodes 5, extending upwardly through the bottom of the hearth, electrodes 4 secured to said combustion ring opposite the spark fingers of the respective electrodes 5 and in circuit with a suitable source of electricity, and rotary means 6 at the center of the hearth for spraying liquid fuel towards said combustion ring. Two pairs of electrodes are illustrated but in many installations one pair is sufficient. The burner or combustion ring 3 is preferably of sheet metal and the outer electrode 4 of each pair may be a block of carborundum or the like mounted in a metal pocket 4a welded to the outer face of said ring 3, the ring having an opening to expose the electrode 4.

The two pairs of electrodes are connected in series. The metal ring 3 being an electrical conductor, wiring that would otherwise be required is dispensed with. Each inner electrode 5 is connected with a suitable source of electric current, the metal combustion ring completing the circuit.

According to the present invention, the inner electrode 5 of each pair is encased in a cover of insulating material. Sillimanite is especially suitable for such use because it retains its insulating ability up to higher temperatures than porcelain and other insulation materials commonly used.

The cover of insulating material comprises an elongated inner cylindrical sleeve or stem 7 and a cylindrical cup or shell 8 concentric with said sleeve but spaced therefrom except at the bottom or outer end of the shell, where the two are integrally united or otherwise secured together. As best shown in Fig. 2, the top of the stem 7 may be covered by a washer 7a held in place by nibs 7b on the electrode 5. The shell is mounted in the side or bottom wall of the combustion chamber near the lower outer corner thereof. Preferably, it is mounted in an upright position in the hearth and extends from slightly above the hearth to a considerable distance below the upper surface of the hearth and preferably entirely through the hearth. This arrangement places the inner end of the electrode in the location desired for ignition of the fuel but exposed to intense heat, which may temporarily render the uppermost portion of the insulating material ineffective for its purpose. However, the annular chamber or space between the inner sleeve and the outer shell of insulating material prevents leakage of the current through the upper portion of the insulating material, while the integral connection of the sleeve and the shell is so far away that it remains cool enough to effectively insulate the electrode. Consequently, the ignition system remains continuously responsive to its duty even when the upper portion of the insulating material is rendered temporarily inoperative by excessive heat; and thus the ignition system is not subject to the delays heretofore required for the cooling of the insulating material sufficiently to restore it to operative condition.

What I claim is:

1. The combination with a combustion chamber for oil burners of the rotary wall flame type of an electrical ignition system having electrodes in said chamber separately mounted and insulated from each other, the insulation of one electrode comprising an elongated sleeve which extends outside the chamber and an elongated shell surrounding said sleeve and connected at its outer end to said sleeve and otherwise spaced therefrom.

2. The combination with a combustion chamber for oil burners of the rotary wall flame type of an electrical ignition system having electrodes in said chamber separately mounted and insulated from each other, the insulation of one electrode comprising an elongated sleeve which extends through the hearth and an elongated shell surrounding said sleeve and connected to said sleeve outside of said hearth but otherwise spaced therefrom.

3. An electrode construction for oil burners of the rotary wall flame type including a hearth and an impact wall against which the fuel is projected, which comprises an insulator cup extending through said hearth adjacent to said impact wall, the bottom of said cup being spaced from the bottom of said hearth, an insulator stem extending through said cup and secured in the bottom thereof, an electrode in said stem, a spark point secured to the top of said electrode and a second electrode mounted in the face of said impact wall.

4. An ignition system for oil burners of the type including a hearth, which comprises an insulator stem, an electrode therein, said stem extending through, and completely isolated by an air space from the walls of an enlarged opening in said hearth and projecting below said hearth, an insulator cup into which said stem extends, the bottom of said cup being secured to said stem and said cup being secured to said hearth and closing the opening therethrough.

5. For use with a liquid fuel burner of the character wherein combustion takes place in a chamber having a bottom defined by a substantially horizontally disposed hearth, said hearth having at least one vertically extending aperture therein, means for igniting fuel in said chamber, comprising a vertically extending electrode of relatively small cross sectional area disposed in said aperture, a heat resistant insulating shell fitted within said aperture and spaced from said electrode to provide a dielectric air space around said electrode, said shell being carried by said hearth and secured to said electrode at a point downwardly remote from the upper surface of said hearth, to thereby protect it against the heat of combustion in said chamber.

6. The apparatus described in claim 5, wherein said shell is shaped to prevent fluid communication between the upper and lower sides of said hearth.

7. The apparatus described in claim 5, wherein said electrode comprises an inner conducting member and an outer insulating member and said shell is joined to said outer member.

8. The apparatus described in claim 5, wherein said shell comprises a cylindrical cup disposed in said aperture and having a plurality of outwardly extending portions disposed in surface engagement with the upper surface of said hearth.

9. In a liquid fuel burning apparatus having a hearth and fuel volatilizing means disposed above the hearth surface, said hearth being provided with an aperture of appreciable cross sectional area, and fuel igniting means cooperating with said aperture, said igniting means comprising a device embodying a single electrode extending through said aperture substantially axially thereof and upwardly to a point well above the hearth, and an insulator fitted in said aperture to snugly fill the latter, said insulator being hollow and in spaced relation to said electrode, the upper end of said insulator terminating substantially flush with the upper surface of the hearth.

10. In a liquid fuel burning apparatus having a hearth and fuel volatilizing means disposed above the hearth surface, said hearth being provided with an aperture of appreciable cross sectional area, and fuel igniting means cooperating with said aperture, said igniting means comprising an electrode extending through said aperture substantially axially thereof, and an insulator fitted in said aperture in direct contact therewith and in spaced relation to said electrode, said insulator comprising a shell-like wall of a length at least as great as the hearth thickness and thereby forming an annular air gap of appreciable depth around said electrode, and means for holding said electrode in position with respect to said wall.

11. In the combination defined in claim 10, said positioning means comprising an integral insulating formation on the lower end of said wall.

FRANK O. COLE.